:# 3,224,970
SILICON-CONTAINING LUBRICANT ADDITIVES

Edwin L. De Young, Milwaukee, Wis., and Roger W. Watson, Highland, Ind., assignors to Standard Oil Company, Chicago, Ill., a corporation of Indiana
No Drawing. Filed Jan. 16, 1962, Ser. No. 167,224
8 Claims. (Cl. 252—463)

This invention relates to novel silicon-containing lubricant additives having the property of inhibiting silver bearing wear.

Many hydrocarbon lubricant oils contain sulfur compounds as oxidation or corrosion inhibitors. Sulfur compounds however tend to promote excessive wear in silver and silver-containing bearings and bushings.

It has now been discovered, according to the invention, that excessive silver wear characteristics in hydrocarbon lubricant oils may be inhibited substantially by incorporating into such oils a small amount, effective to cause such inhibition, of the reaction product between silicon disulfide and an olefinically unsaturated hydrocarbon.

The inventive additives may be prepared in a facile manner merely by reacting finely divided silicon disulfide with the corresponding olefinically unsaturated hydrocarbon. Such hydrocarbons are preferably the alkenes of from 4 to about 100 carbon atoms per molecule, and should be selected so that the resultant reaction product has sufficient solubility in lubricant oils to effect substantial silver wear inhibition. The preferred alkenes are the straight chain alkenes or, optimally, the branched chain alkenes which are obtained by polymerizing low molecular olefins such as propylene or isobutylene. Propylene polymers are exceptionally suitable; the material known commonly as "propylene tetramer" may be prepared by reacting propylene over a phosphoric acid-on-kieselguhr catalyst and fractionating the resultant product. The various polybutenes are conventionally obtained by reacting a mixed refinery butene-butane stream over a Friedel-Crafts catalyst and fractionating the product. Other olefinically unsaturated hydrocarbons which are suitable as reactants with silicon disulfide include 1-butene, 2-butene, isobutylene, 1-hexene, 1-octene, isooctene, 1-decene, the terpenes, styrene, alpha-methyl styrene, divinyl benzene, and the various propylene and isobutylene polymers of appropriate molecular weight and solubility characteristics.

The reaction itself is conducted under anhydrous conditions so as to avoid hydrolyzing the silicon disulfide and/or the reaction product. Ordinarily it is necessary to heat the mixture of silicon disulfide and olefin to a temperature of around 300° C., plus or minus, say, 50° C., and to maintain such heating until substantially all of the hydrogen sulfide evolution is terminated. It is advisable to employ a molar excess of olefin to silicon disulfide, although for optimum utilization of both reactants it is advisable to maintain the ratio of olefin to silicon disulfide as closely as possible to on a molar basis.

The inventive additive may be incorporated into a wide variety of hydrogen lubricant oils which normally tend to cause silver wear. The hydrocarbon base may have any composition or viscosity suitable for use as lubricant oil, and illustratively may have viscosity ranging from 20 S.S.U. at 100° F. to 3,000 S.S.U. at 210° F. It may derive from natural, i.e., mineral sources, such as petroleum oil, or may itself be a synthetic oil composed of, for example, butylene polymer or hydrogenated butylene polymer. The compounded oil may contain various additives for the purposes of improving lubricity, extreme pressure characteristics, oxidation resistance, viscosity index, pour point, anti-rusts, etc.

It is generally believed that silver bearing wear is a function of sulfur—probably organic—containing additives in lubricant oils. These additives may, depending upon the lubricant formulation, be in the form of metal sulfonates, metal phenol sulfides, metal dithiophosphates, phosphorus pentasulfide-terpene reaction products, sulfurized hydrocarbons, sulfurized sperm or tall oil, octyl polysulfide etc.

The inventive additives are incorporated into such lubricant oils in small amounts effective to inhibit silver wear characteristics. Such amounts may range from as little as 0.05 weight percent, or even less in some cases, to as much as 3 percent or perhaps even more, with the precise amount depending upon initial silver wear tendencies and upon the desired degree of inhibition. It is comparatively simple to determine the desired concentration by employing, for example, the Falex test utilizing a silver ball; the Falex test is described in Journ. Inst. Pet., 32, April 1946.

To illustrate the invention in its various aspects, the following embodiments are presented. It will be understood that these are for illustrative purposes only and do not purport to be wholly definitive with respect to scope or conditions.

Example 1

In this example an additive is prepared from silicon disulfide and propylene tetramer, a 12-carbon atom branched chain olefinically unsaturated hydrocarbon.

To 33.6 grams (0.2 mol) of propylene tetramer is added 9.2 grams (0.1 mol) of silicon disulfide. The mixture is heated to 200° C. for about 6 hours, after which hydrogen sulfide evolution ceases. It is then cooled, and is in the form of an orange colored oil which analyzes 0.11 weight percent silicon.

To test this additive for silver wear inhibition, comparative tests are made using, in each case, a 73 viscosity index mineral base oil containing 2.8 weight percent detergent (barium neutralized and hydrolyzed phosphorus pentasulfide-hydrocarbon reaction product), 1.0 percent calcium phenate, and 0.2 weight percent sulfurized terpene. In the absence of any silver wear inhibitor, the Falex ball shows 275 milligrams weight loss; with only 0.5 weight percent of inhibitor the weight loss is reduced to 76.5 and 25.5 milligrams in duplicate runs.

Example 2

In this example an additive is prepared from 1-hexene, substituting equal molar quantities of hexene for propylene tetramer. When tested at a concentration of 0.05 weight percent in the above-described lubricant composition, excellent silver wear inhibition is observed.

Example 3

In this example an inhibitor is prepared from a 20-carbon atom straight-chain 1-alkene. 1.0 weight percent concentration in the above mineral lubricant oil (following Example 1 for preparation and testing details), excellent silver wear inhibition is attained.

Example 4

In this example, following the procedure of Example 1 but substituting an identical molar quantity of alpha-methyl styrene for the propylene tetramer, an additive is obtained which, at 0.5 weight percent concentration in the standard lubricant composition, displays excellent silver wear inhibition.

Example 5

In this example an inhibitor is prepared from a commercial terpene mixture and silicon disulfide. To 27.2 grams (0.2 mol) of terpenes is added 9.2 grams (0.1 mol) of powdered silicon disulfide. The product is heated to 200° C. for 6 hours, after which it is cooled and tested with a silver ball Falex tester.

The base oil in this case differs from that of the previous examples, and has a silver wear loss of 264.5 milligrams without any inhibitor. However, with 0.5 weight percent of the inhibitor of this example, duplicate runs display losses of 100.8 and 122.3 milligrams.

The above examples may be repeated with other alkenes, including butadiene; cycloalkenes such as cyclohexene, methylcyclohexene and propylcyclobutene; aralkenes such as styrene, etc., advantageously of between about 4 and 100 carbon atoms per molecule, preferably between about 6 and about 24 carbon atoms per molecule.

Thus it is evident that there has been provided in accordance with the invention an outstanding silver wear inhibitor for hydrocarbon normally tending to exhibit undesirably high silver wear. While the invention has been described in conjunction with certain specific embodiments thereof, it is evident that these are by way of illustration only, and accordingly various alternatives, modifications, and variations will be apparent to those skilled in the art in light of the foregoing description. Accordingly, it is intended to embrace all such alternatives, modifications, and variations as fall within the spirit and broad scope of the appended claims.

We claim:
1. The oil-soluble reaction product obtained by reacting under anhydrous conditions an olefinically unsaturated hydrocarbon and silicon disulfide in a molar ratio of about 1–2:1 of hydrocarbon:disulfide at a temperature of from about 200 to about 350° C. until the evolution of hydrogen sulfide ceases.
2. The product of claim 1 wherein said hydrocarbon is an alkene of from 4 to about 100 carbon atoms per molecule.
3. The product of claim 1 wherein said hydrocarbon is a propylene tetramer.
4. A hydrocarbon lubricating oil containing a sulfur-containing additive normally causing excessive silver wear, and a minor amount sufficient to inhibit such wear of the oil-soluble reaction product obtained by reacting under anhydrous conditions an olefinically unsaturated hydrocarbon and silicon disulfide in a molar ratio of about 1–2:1 of hydrocarbon:disulfide at a temperature of from about 200 to about 350° C. until the evolution of hydrogen sulfide ceases.
5. Composition of claim 4 wherein said olefinically unsaturated hydrocarbon is an alkene of from 4 to about 100 carbon atoms per molecule.
6. Composition of claim 5 wherein said alkene is a propylene tetramer.
7. The composition of claim 4 wherein said lubricating oil is a mineral lubricating oil.
8. The composition of claim 7 wherein said sulfur-containing additive is sulfurized terpene, and said unsaturated hydrocarbon is a propylene tetramer.

References Cited by the Examiner
UNITED STATES PATENTS

| | | | |
|---|---|---|---|
| 2,438,612 | 3/1948 | McKenzie et al. | 260—448.2 |
| 2,448,391 | 8/1948 | Pyle | 260—448.2 |
| 2,628,246 | 2/1953 | McKenzie et al. | 252—49.6 X |

DANIEL E. WYMAN, *Primary Examiner.*

ALPHONSO D. SULLIVAN, *Examiner.*